May 1, 1934. L. W. HAAS 1,957,334

BLEACHING AGENT AND PROCESS OF PREPARING BLEACHED BREAD DOUGH

Filed Nov. 28, 1930

Inventor
Louis W. Haas.

By Stone, Boyden, Mack & Hahn
Attorneys.

Patented May 1, 1934

1,957,334

UNITED STATES PATENT OFFICE 1,957,334

BLEACHING AGENT AND PROCESS OF PREPARING BLEACHED BREAD DOUGH

Louis W. Haas, Chicago, Ill., assignor, by mesne assignments, to J. R. Short Milling Company, Chicago, Ill., a corporation of Illinois Application November 28, 1930, Serial No. 498,837

6 Claims. (Cl. 99—10)

REISSUED

This invention relates to a process of bleaching vegetable flour, and more particularly to a process of bleaching wheat flour in the presence of air or oxygen, warmth, and moisture, and the use of high speed agitation.

One of the objects of the invention is the provision of a new and improved medium or active agent for bleaching flour and more particularly wheat flour, to be used during the mixing of dough in the process of making bread.

Another object of the invention is the provision of a new and improved means or bleaching agent for decolorizing carotin, the yellow pigment found in grains, seeds, plants, and other vegetation.

A further object of the invention is the provision of new and improved medium for use in bleaching flour, that is cheap to manufacture, easily obtained in the raw state readily applied and that is efficient and satisfactory in use.

A still further object of the invention is the provision of new and improved means for bleaching that has nutritive value; is harmless to the dough or bread subsequently baked therefrom; and is not injurious to the health of the consumer.

The above mentioned objects in their broader aspects are presented in the application of Haas & Bohn, Ser. 310,673, filed October 5, 1928. The present invention relates to specific improvements on certain of these features.

Heretofore, it has customarily been the practice to bleach the flour at the mills, this necessitating bleaching the same in the dry state.

Until introduction of the present invention, there have been four principal processes or methods of bleaching flour in commercial use, as follows:

1. With nitrogen peroxide.
2. With chlorine, sometimes containing a small amount of nitrosyl chloride.
3. With nitrogen trichloride.
4. With benzoyl peroxide.

Each of the above processes has certain disadvantages.

The nitrogen peroxide method does not bleach the flour to the desired extent. In bleaching with nitrogen trichloride and chlorine it is difficult to obtain uniformity in performing this operation. A slight overbleach with these chemicals seriously damages the flour. Even a normal bleach may cause the flour to deteriorate rapidly in storage. The treatment of flour with these two chemicals, chlorine and nitrogen trichloride, causes more than a mere bleaching of the flour. The protein or gluten of the flour is "oxidized" or developed so that the bread obtained from such bleached flour has more volume and a greater grain and texture refinement than is the case with the unbleached flour. These qualities may be helpful to the baker under certain circumstances, although if a small, compact loaf is desired, they are detrimental. The bleaching process using benzoyl peroxide does not affect the baking process to any marked degree, but has the disadvantage that the reagent used (benzoyl peroxide) is mixed with the flour in such minute amounts that even distribution throughout the flour mass is difficult to obtain. Benzoyl peroxide is also very expensive, and bleaching by this method costs several times as much as by the other processes.

It has been proposed to use as catalyzers to promote the action of the peroxide either chemicals or enzymes of the oxydase or peroxydase class. As one result thereof an advantage is ascribed to the increase in the volume of loaves obtained from the same quantity of untreated flour.

The present invention seeks to eliminate these difficulties and complex treatments by the provision of a bleaching agent that is cheaply and readily prepared; that is easily obtained in the raw state; that in no way affects the flour except to decolorize the carotin therein; that possesses food value; that is efficient and satisfactory in use in that it may be and preferably is incorporated in the flour when the dough is mixed preparatory to baking the bread, thereby eliminating the time and expense of a separate bleaching operation.

This bleaching agent is entirely of vegetable origin and is probably itself an enzyme or enzyme-like substance. It decolorizes the yellow carotin which gives unbleached flour its characteristic yellowish color. It contains an abundance of active bleaching or carotin-removing enzymes. The bleaching property of the agent is destroyed at the temperature of boiling water. It acts rapidly at temperatures between 40 and 50 degrees centigrade, and fairly rapidly at room temperature.

This process of bleaching flour, or more exactly the dough made therefrom, has a number of advantages. In the first place, no chemicals are used. Secondly, the danger of overtreatment of the flour or dough is non-existent since the active principle or bleaching agent employed is an enzyme obtained from a vegetable source. The use of an excess of several times the amount necessary to bleach the flour will cause no damage whatever, although large excessive amounts, if certain beans be used, as for example soy beans, will provide an undesirable bean flour flavor and the color of the soy bean flour will begin to become noticeable since the bleaching action operates selectively to whiten the unbleached wheat flour but does not whiten the bean flour. Thirdly, the baking characteristics of the flour are not changed. Thus, the baker can obtain any desired further development of his dough and gluten by use of a yeast food, high-speed mixing, etc. Fourthly, wheat flour can be manufactured and sold unbleached, in which condition it is best fitted to keep well in storage.

As at present known, the most practical source of this enzyme material or bleaching agent is the soy-bean, although it is understood that the invention contemplates its use as a carotin-decolorizing agent from whatever source derived. One method of obtaining this enzyme in an active state and by a process commercially practicable, has been described in detail in the application Serial No. 310,673, filed October 5, 1928. By that method, the beans are first soaked in water, then washed and ground to a paste or sludge which is mixed with a gelatinized cereal flour. Other methods, also described in the aforesaid copending application, include grinding the soaked soy-bean paste and drying it vacuo, then grinding to a powder, and the method of grinding the soaked soy-beans with additional water, subjected to filtration to remove the fiber, and the filtrate dried at a low temperature and ground to a powder.

In another embodiment of the invention, the washing and soaking methods described in the application Serial No. 310,673, filed October 5, 1928, can be dispensed with. One such alternative method of obtaining the material with the enzyme in an active state and by a process commercially practicable, is by treating soy-beans as follows:

Wash the beans to free them from adhering dirt and immediately dry them at a temperature which must not be over 155 degrees F., for a sufficient length of time to reduce their moisture content to 8% or less, fresh beans having as high as approximately twice this amount of moisture. It is preferable that the conditions of operation are so chosen that the temperature may be so controlled that it does not rise over 120° to 130° F. By this drying process the beans are prepared for milling. After drying the beans to the required moisture content, which may be readily determined by sample analysis, remove the beans from the drying apparatus and grind them to a flour, grinding them in such a way as to cause removal of the hulls as completely as possible by ordinary means i. e., aspiration. Then further reduce the hull-free material to a fine powder, a granulation similar to wheat flour. The finer the granulation, the better, as long as during the process the temperature of the material does not rise above 155°. Under these conditions of drying, the activity of the material is not harmed, while higher drying temperatures would seriously impair the bleaching action of the beans.

In the process of grinding and milling, the flour is passed repeatedly through sifting devices, so as to remove any coarse material and to obtain flour of fairly uniform and fine granulation.

The flour thus obtained is then mixed with a filler or diluent so as to reduce the bleaching strength and to improve the keeping qualities of the active bleaching material. It has been that a good dilution is obtained by mixing one part of bean flour with four parts of another finely ground cereal product such as processed corn flour formerly known to the trade as "Ceratose" and now as "Ceratex" and which has a high starch content.

The mixture just described contains 20% of soy bean material. It has now been proved that of this mixture as little as 0.75% to 100 lbs. of flour in the dough will have a perceptible bleaching effect and this quantity of bleaching material would be considered as the minimum for practical purposes. This would correspond to 0.15% of the bean material itself. The amounts which one may safely use without imparting an appreciable foreign flavor to bread was found to be about 2.00% of the mixture, which corresponds to about 0.40% of the soy bean material itself. Above that amount the agents flavor appears noticeable and quality is thus lowered.

According to the present invention, the quantity of soy bean material to be used for bleaching purposes is between 0.15% and 0.40%. If less than the minimum quantity is used, then little benefit can be observed and if more is used, the flavor of the bread is too adversely affected.

The last step of mixing or dough making just mentioned is preferably done in the presence of air or oxygen in a modern high speed mixer, although mixers having slower speeds may also be used, but with somewhat less satisfactory results. The operation of a preferred form of high-speed mixer may be more readily understood by reference to the accompanying drawing, in which.

Figure 1:
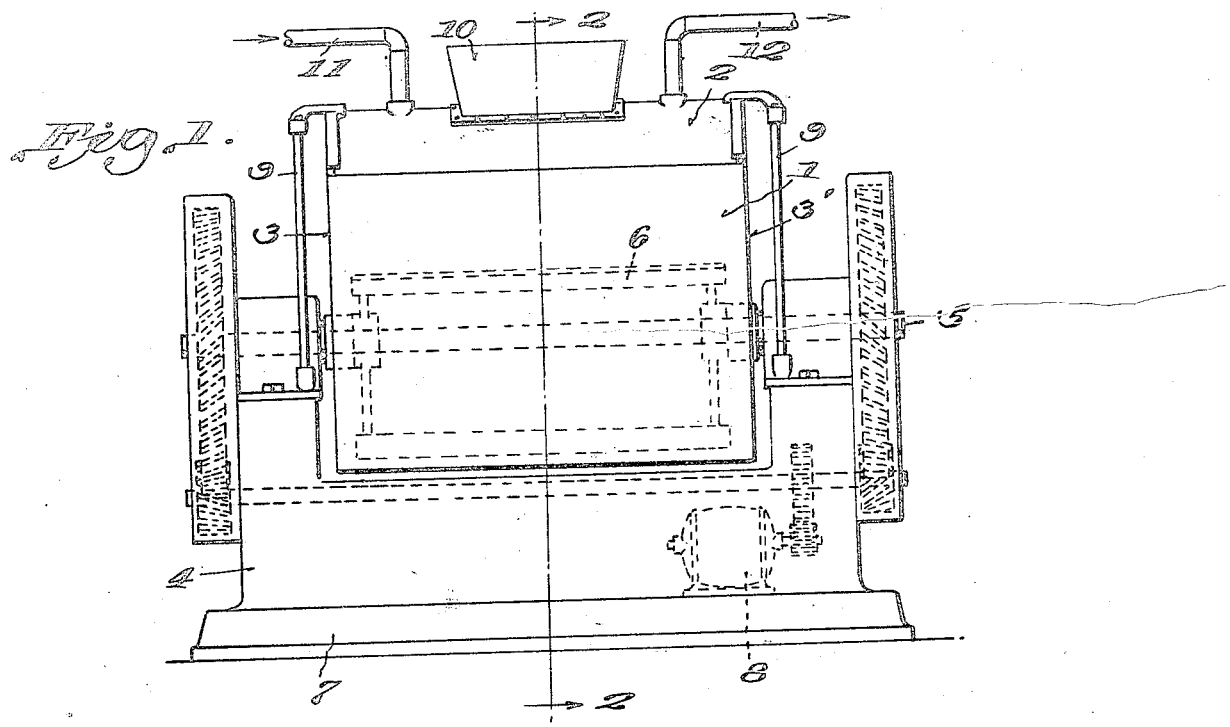
Figure 1 represents a front elevation of a suitable form of mixer.

In the drawing, 1 designates the mixer casing, 2 a stationary cover normally closing the casing 1 and provided with a supply chute 10 for the admission of flour and other ingredients. Air inlet and outlet pipes 11 and 12 respectively are provided through which an aerating medium such as air or oxygen may be circulated by means of a fan or blower (not shown). 3 and 3' represent the ends of the casing. The casing is supported slidably with respect to cover 2 which is held in position by vertical supports 9 rising from housings 4. Housings 4 are of box construction mounted on base 7 and comprising the bearings and supports for the shaft (later to be described) and, through the medium of supports 9, also support the mixing tank. They also provide supports for gear guards or casings which protect the drive gears. The shaft 5, which with the stirring and kneading bars 6 affixed thereto by a spider constitute the mixing and kneading mechanism, is mounted on housings 4 and is rotated by means of an electric motor 8. This motor is one of at least 25 horsepower, and capable of giving to the mixing and kneading mechanism a speed of 60 to 75 revolutions per minute. The tank casing 1 may be turned and lowered through an arc of a circle on an axis eccentric to the axis of shaft 5 by means of a suitable control device for dumping (not shown), so as to discharge the contents through from the front face thereof.

Figure 2:
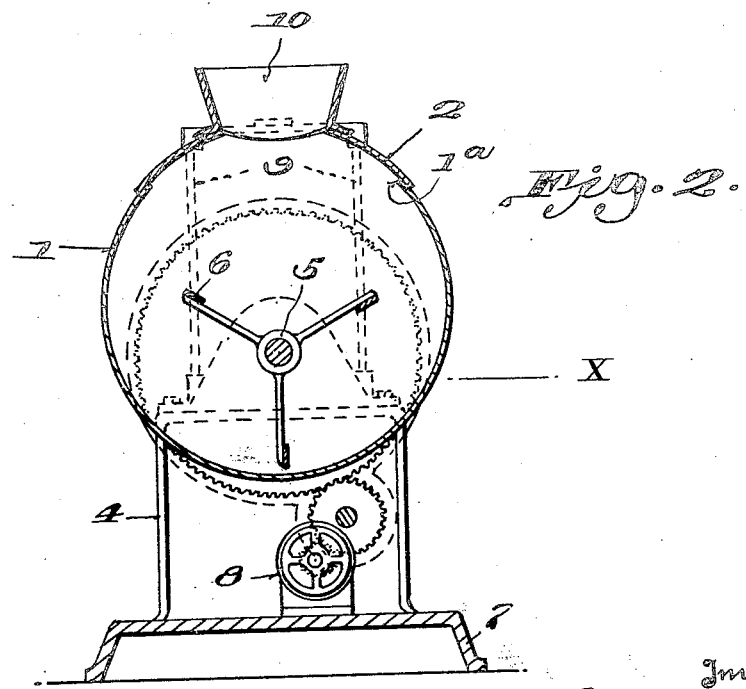
Figure 2 represents a vertical section of the mixer on line 2—2 of Figure 1.

During the dumping operation the casing 1 is moved so that its forward upper edge 1a is lowered to approximately the point indicated at X in Figure 2. The stirrer arms are then able to push the dough out of the opening thus provided.

In the mixing operation, the dough ingredients are supplied to the tank through chute 10 and the motor is speeded up till the shaft 5 rotates at a steady speed of 60 to 75 revolutions per minute. The supply of aerating fluid preferably air, is then turned on and owing to the influence of the high speed mixer the dough is so well agitated and stretched out and clotted together and again stretched out, that practically every particle of the dough comes to the outside and in contact with the air. It is probably due to this contact with air that the bleaching effect of the carotin decolorizing agent is greatly promoted. Evidently the dough containing the agent takes up the oxygen of the air very quickly and this absorption of oxygen, therefore, is increased with an increased dough surface and vigorous high speed mixing. The dump control device is then put into operation, and the dough batch is discharged forwardly into suitable receptacles.

It is to be understood that the device illustrated in the drawing is merely one embodiment of the type of mixer which it is desired to employ. Other types of high-speed mixers might also be used to good advantage, provided that they are equipped with adequate means for the circulation of an aerating medium, and are capable of sustaining a speed of 60 revolutions of the agitator per minute or more. The mixing could, of course, be done by other methods, but the high speed aerating mixer method is by far the most satisfactory.

The invention is not limited to the use of soy-bean material alone, as other types of vegetable material have been found to contain active carotin removing enzymes, though to a somewhat less extent than soy-beans.

As to other sources of bleaching material, it has been found that most other common legumes, i. e. beans, peas, lentils, etc. contain some bleaching material principle. However, they are all inferior in this respect to the soy-bean. Navy beans, kidney beans, lima beans, and other beans contain only about half as much active ingredient. Lentils and peas, including green peas and yellow split peas, seem to contain a little more than even beans, but their strength, too, is much lower than that of soy-beans. In addition, these other beans and legumes are much higher in price than soy-beans, so that soy-beans seem to be the most practical source of bleaching principle. It has been found that horse radish and turnips possess bleaching properties, but they, too, are inferior to the soy-bean as to potency and are much more expensive. In addition, these impart a very undesirable odor and flavor to bread. The raw, fresh potato also shows some bleaching effect, but not nearly as much as the legumes. Various types of seeds, tubers, bulbs, and nuts, especially peanuts, have shown some bleaching effect, but much less than soy-beans.

A few additional examples will help to show the way in which some of the other materials may be used.

I. Potatoes and turnips are used in the following way: Both materials were cleaned and peeled and then pulped and used to the extent of 1% of the total flour. The effect of bleaching is then noted in the usual way.

II. Dried preparations of the cleaned and peeled potatoes and turnips are made by drying the pulp prepared in the above way at a temperature not exceeding 120° F. Of the dried material 0.50% was used of the total flour.

Tests show that at least 0.50% of the dried potato or turnip pulp is necessary to effect a noticeable bleaching but even then the bleaching is not nearly so strong as with much smaller quantities of pulverized legumes.

To use potatoes and turnips as bleaching materials, it is desirable to mix one to two parts of the dried material with one half to one part of prepared corn flour ("Ceratex"). Of course, this mixture could also be prepared by using the undried pulp, in corresponding quantity, and then effect drying in such a way that the temperature during the drying process does not rise above 120° to 130° F.

The use of navy beans, lentils, and yellow split peas proves their effectiveness. However, these materials are much more expensive than soy beans and they are not quite as efficient as the latter.

III. The navy beans, lentils, and split peas are either ground dry until the flour passes an 80 mesh sieve or these materials are soaked for eighteen to twenty-four hours in water at room temperature and then dried at a temperature below 120° and the dried material ground to pass through an 80 mesh sieve. Baking tests have been made then with these materials using 0.25% to 0.50% of the flour obtained from the soaked, as well as the unsoaked legumes. In all cases, distinct bleaching is observed, but the effect is inferior to the effect obtainable with corresponding quantities of soy bean material.

Lentils prove a little more effective than peas and peas a little more than navy beans, but even the lentils are not quite so strong as the bleaching effect of corresponding quantities of soy-bean.

If the strength of soy-bean is arbitrarily designated as "100", then lentils show a bleaching effect of about 85; yellow split peas about 75, navy beans about 70. These relative bleaching strengths determine the quantity of the leguminous material to be blended with Ceratex.

As at present about twenty parts of soy-bean flour (from unsoaked beans) is used to eighty parts of Ceratex, it is necessary to blend about twenty-four parts of ground lentils with seventy-six parts of Ceratex, and twenty-seven parts of ground yellow split peas with seventy-three parts of Ceratex and about thirty parts of navy bean flour with seventy parts of Ceratex.

If the flour from the raw, that is, unsoaked beans, lentils, and peas is blended with Ceratex in the above mentioned proportions, preparations will be obtained which possess about the same bleaching strength as a mixture of twenty parts of soy-bean with eighty parts of Ceratex.

It is of interest to note that the bleaching strength of any of the legumes mentioned is but slightly affected by soaking. Soaking seems to have a slightly beneficial effect in the case of lentils, while the effect of beans and peas seems to be negligible.

It is further important to note another point which has a marked bearing on the bleaching action obtainable. It has been found that very thorough mixing, especially with high speed mixing machines, as described herein, is an essential requirement, to obtain best bleaching results. Doughs mixed by hand or in the old type so-called "slow speed" mixers do not improve much in color, no matter how much bleaching material is added, unless the doughs are very slack or soft. This latter feature is described and claimed in my copending application, Serial 570,963, filed October 24, 1931 and Serial 692,903, filed October 9, 1933. It would seem that the incorporation of air (especially oxygen in the air) is very beneficial and necessary. Claims to high speed treatment broadly and without reference to introduced air or oxygen are presented in the application of Haas and Bohn, Serial 310,673, filed October 5, 1928.

All the commercial bean flours investigated in the development of this invention have shown little or no bleaching strength. They evidently have been produced in such a way as to harm the bleaching principle contained in the raw beans. No doubt the beans were heated higher than the temperature specified herein, either to produce a more agreeable flavor of the bean flour or to prepare the beans for the extraction of the oil. This is especially true with the commercial soy-bean flours on the market, according to which, even though the beans have a rather high oil content (about 20%), it is necessary to heat the beans to facilitate expelling the oil, and always to a temperature too high for the enzyme to remain capable of exercising bleaching power.

Experience has shown that the bleaching agent may be mixed with unbleached flour at the mill, and that the mixture may be kept indefinitely without deterioration, so long as it is maintained in the dry state.

Emphasis is placed in this case, as in copending application Serial No. 310,673, filed October 5, 1928, on the fact that the beans are used in the raw state, i. e. they have not been heat treated at a sufficient temperature to destroy the bleaching power.

The bean material is not used in quantity large enough to give its own yellow color or its peculiar flavor to the baked product.

From the foregoing, it will be noted that the vegetable bleaching material is not subjected to any wetting action after granulation is begun or after the vegetable itself is modified from its original shape. As applied to soy beans, for example, the beans may be wet or otherwise treated in the process of washing and cleaning them, but after being cleaned the material is not further moistened at any stage to the very completion of the bleaching agent. This absence of wetting finds its counterpart in the claims in the term "unwetted".

What I claim is:

1. A process of making bread comprising incorporating with unbleached flour and other ingredients to form a dough batch a carotin-decolorizing agent comprising a raw comminuted vegetable material which has been maintained dry from the time when comminuted until when used in the dough batch.

2. A process of making bread comprising incorporating with unbleached flour and other ingredients to form a dough batch, a carotin-decolorizing agent comprising a raw vegetable material in powdered form and which has been maintained dry from the time when comminuted until when used in the dough batch.

3. The process of bleaching flour comprising incorporating with unbleached flour and other ingredients to form a dough batch a carotin decolorizing agent derived solely from vegetable origin, and subjecting the batch to high speed agitation in a closed container and in the presence of positively introduced oxygen.

4. The process of bleaching flour comprising incorporating with unbleached flour and other ingredients to form a dough batch a carotin decolorizing agent derived solely from vegetable origin, and subjecting the batch to high speed agitation in a closed container and in the presence of positively introduced oxygen.

5. The process of producing from legumes an agent for bleaching flour which process consists in cleaning the legumes, drying the cleaned legumes at a temperature not exceeding 155° F. until the legume contains not over 8% of moisture, and reducing the resultant dried legume to the condition of flour.

6. The process of producing from legumes an agent for bleaching flour which process consists in cleaning the legumes, drying the cleaned legumes at a temperature not exceeding 155° F. until the legume contains not over 8% of moisture, and mixing the latter with a larger proportion of a flour-like diluent.

LOUIS W. HAAS.